April 20, 1954 J. F. BYRD ET AL 2,676,272
SOUND AND PICTURE CHANGEOVER SYSTEM
Filed June 10, 1952
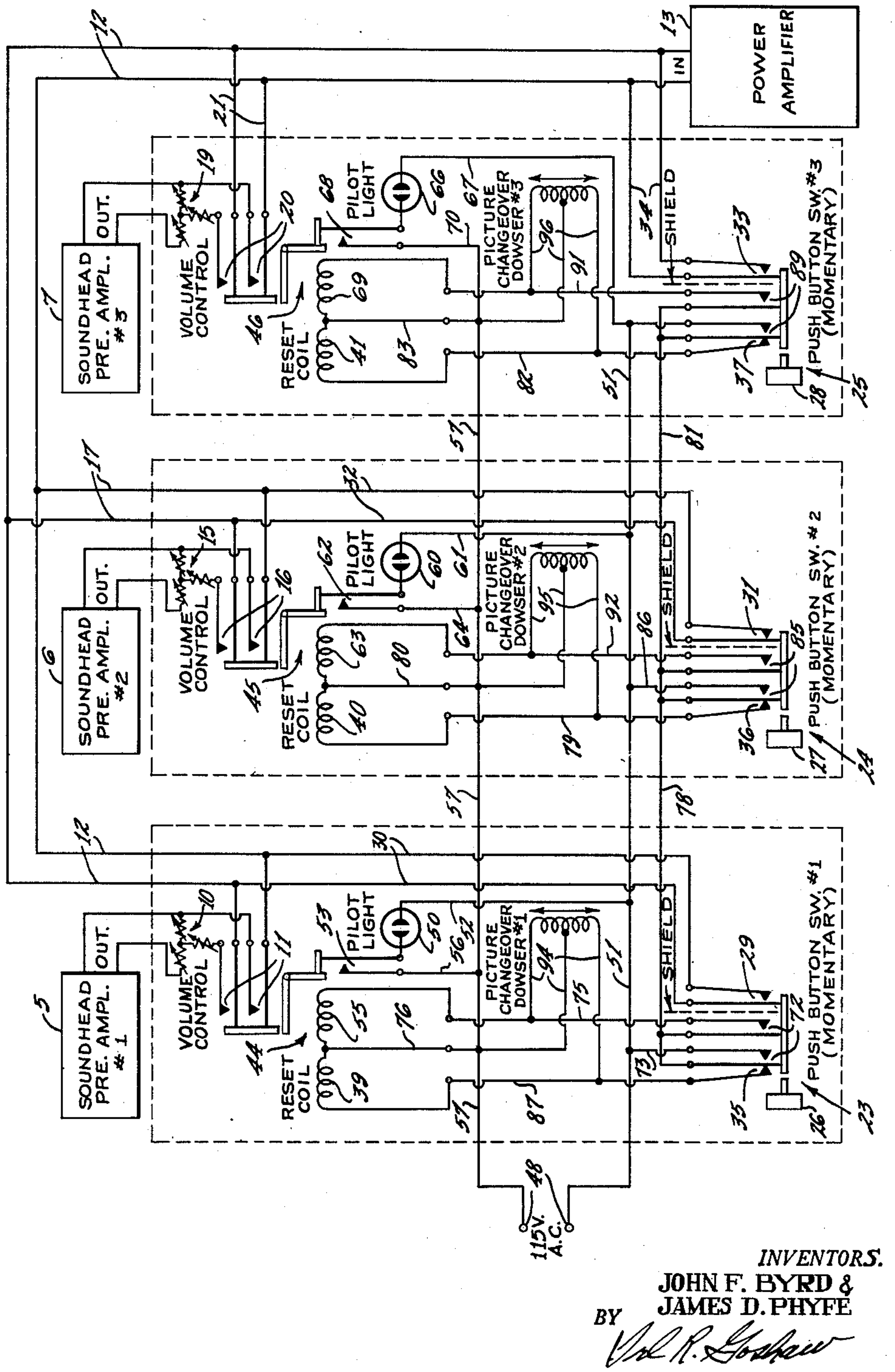
*INVENTORS.*
JOHN F. BYRD &
JAMES D. PHYFE
BY [signature]
*ATTORNEY.*

Patented Apr. 20, 1954

2,676,272

UNITED STATES PATENT OFFICE 2,676,272

SOUND AND PICTURE CHANGEOVER SYSTEM

John F. Byrd, Ashland, and James D. Phyfe, Moorestown, N. J., assignors to Radio Corporation of America, a corporation of Delaware Application June 10, 1952, Serial No. 292,761

10 Claims. (Cl. 307—113)

This invention relates to combined sound and picture changeover systems, and particularly to an all-electric system for changing over both picture and sound from one sound picture projector to another by a single push button located at each of the projectors.

Changeover systems for sound picture projectors in theater film projection booths are well-known, many of these systems using an interconnecting rod between projectors on the front wall of the booth, while others use complex electrical controls to perform the functions of the present invention. One prior system is disclosed and claimed in J. D. Phyfe U. S. Patent No. 2,440,184 of April 20, 1948. The present system utilizes a momentary type of push button switch at each projection machine which first shorts the audio input to the power amplifier so that subsequent connections and disconnections do not create a disturbance in the current-to-sound wave transducers or loudspeakers. Further movement of the button connects a power source to the actuating relays for connecting the output of an incoming sound reproducer to the power amplifier. It also clears all unwanted circuits by opening the output circuits of all the reproducers not being used. In addition to switching the sound between reproducers, the system also simultaneously operates the picture dowsers by energizing the dowser actuating solenoids in the well-known manner. It is not limited to only two projecting machines, but is suitable for controlling any number. Also, any particular sound portion of a sound record may be deleted by a partial actuation of any control button.

The principal object of the invention, therefore, is to facilitate the changeover of sound and picture between multiple sound picture projectors.

Another object of the invention is to provide an improved all-electric changeover system which utilizes momentary push buttons at each projector.

A further object of the invention is to provide an all-electric sound and picture changeover system which is adaptable for more than two sound picture projector units.

A still further object of the invention is to provide an improved all-electric sound and picture changeover system which is particularly economical to manufacture, install, and maintain.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which the single figure is a combination schematic and diagrammatic drawing of the system embodying the invention.

As shown in the drawings, three sound current generators, such as soundhead units 5, 6, and 7, are indicated, these units including the necessary exciter lamps and preamplifiers, which are required to translate the sound track on a motion picture film to electrical currents. It is understood, of course, that other sound sources may be used as well as sound film. The output of soundhead No. 1 is connected over a volume control unit 10, switch contacts 11 when closed, and conductors 12 to a power amplifier unit 13, which may feed loudspeakers or sound recorders. The output of soundhead unit No. 2 is connected over volume control unit 15, contacts 16 when closed, conductors 17, and conductors 12 to amplifier 13. Soundhead unit No. 3 is connected over volume control unit 19, contacts 20 when closed, conductors 21, and conductors 12 to power amplifier 13. Additional units could be added, if desired, by paralleling the circuits.

The soundhead unit No. 1 is controlled by a momentary push button switch shown generally at 23; soundhead No. 2 is controlled by a momentary push button switch shown generally at 24; and soundhead No. 3 is controlled by a momentary push button switch shown generally at 25. Each switch has respective hand or finger actuating buttons 26, 27, and 28. The normal position of switches 23, 24, and 25 are as shown in the drawings. The switches are biased to the positions shown in any well-known manner. The input to amplifier 13 is short-circuited by a contact 29 at switch 23 when closed over conductors 30. A similar contact 31 at switch 24 short-circuits the input to amplifier 13 over conductors 32, and contact 33 of switch 25 will short-circuit the input of amplifier 13 over conductors 34 when the contact is closed. The left-hand contacts 35, 36, and 37 of the respective switches are normally closed, and control the reset coils 39, 40, and 41, respectively, of latching relays shown generally at 44, 45, and 46. All of these relays and switches are shown in the drawing in reset or normal positions.

A source of energy, such as an 115-volt alternating current supply, may be connected to the system at terminals 48. A pilot light 50 is connected to this supply over conductor 51, conductor 52, contact 53 when latching relay 44 is energized by its coil 55, conductor 56, and conductor 57. Similarly, the pilot light 60 is energized over conductor 51, conductor 61, contact 62 when coil 63 of latching relay 45 is energized, conductor 64, and conductor 57. Similarly, pilot light 66 is energized over conductor 51, conductor 67, contact 68 when closed by the energization of coil 69 of latching relay 46, conductor 70, and conductor 57. These pilot lamps show which particular machine is in operation at any time.

Assume it is desired to connect soundhead No. 1 for reproduction and actuate the dowser for its picture projector, then switch 23 is momentarily actuated. The switch contacts of switch 23 are so adjusted that the first action is the closing of contact 29, which short-circuits the input to amplifier 13. The next action is the breaking of contact 35 to prevent energization of its reset coil 39. Next, further movement of the switch will make contacts 72 and the making of these contacts will connect energy from the 115-volt source connected at 48 over conductor 51, conductor 73, closed contacts 72, conductor 75, coil 55, conductor 76, and conductor 57. Latching relay 44 is thus energized, and when actuated, it closes contact 53 to energize pilot light 50 over the circuit just described and closes contacts 11 to connect the output of soundhead No. 1 to power amplifier 13.

Assuming that soundhead No. 2 was previously operating, then power will be also supplied over contacts 72, conductor 78, contact 36 at switch 24, conductor 79, reset coil 40 of latching relay 45, conductors 80, and conductor 57. Thus, the contacts 16 will be broken along with the contact of pilot light 60. If we assume that soundhead No. 3 was previously operating, then reset coil 41 of latching relay 46 is energized over contacts 72, conductor 78, conductor 81, contact 37 at switch 25, conductor 82, coil 41, conductor 83, and conductor 57. Thus, the momentary actuation of any particular switch first shorts out the input to amplifier 13, then connects the incoming soundhead to the power amplifier, and then disconnects the outgoing soundhead and clears all unwanted circuits.

For instance, when switch 24 is actuated, contacts 85 are made, which will energize reset coil 39 of soundhead No. 1 over conductor 51, conductor 86, left-hand contact 85, conductor 78, contact 35, conductor 87, reset coil 39, conductor 76, and conductor 57. This will also be true if switch 25 were actuated, closing contacts 89, the left-hand contact energizing the coil 39, while both contacts would supply power to the coil 69 over conductor 91, coil 69, conductor 83, and conductor 57. The closing of both contacts 85 of switch 24 will energize the actuating coil 63 of latching relay 45 over the two contacts 85, conductor 92, coil 63, conductor 80, and conductor 57. After any of switches 23, 24, and 25 are released, their short-circuiting contacts 29, 31, and 33 are broken and the respective soundhead is connected to amplifier 13.

There is thus provided a very simple system for not only changing sound without disturbing switching noises in the loudspeakers, but also for actuating the respective dowsers which have a pair of solenoids similar to the latching relay coils and are energized over respective conductors 94, 95, and 96. Since the short-circuiting contacts 29, 31, and 33 are made before the contacts 35, 36, and 37 are broken or contacts 72, 85, and 89 are made, the deletion of any portion of any sound record in any machine may be accomplished by partially actuating any button so as to only make its short-circuiting contact.

We claim:

1. A changeover system comprising a plurality of sound current generators, an amplifier connectable to the outputs of all of said generators, electrically operative switches each having a pair of windings and a plurality of contacts for connecting and disconnecting the outputs of said generators to and from said amplifier, a power supply, a manually operative switch at each of said generators, and circuit means interconnecting said electrically operative switches, said power supply, and said manually operative switches, each of said manually operative switches having a pair of normally open contacts which are first closed for short-circuiting the input of said amplifier, a pair of normally closed contacts which are then opened to prevent the connecting of one of said windings of said electrically operative switch to said power supply, and a plurality of contacts which are then made for connecting said power supply to the other winding of said electrically operative switch associated with said manually operative switch and one of the windings of each of said other electrically operative switches.

2. A changeover system in accordance with claim 1, in which electrically operative relays corresponding in number to said electrically operative switches are provided, said electrically operative relays each having a pair of windings connected in parallel with the pair of windings on a respective electrically operative switch.

3. A changeover system in accordance with claim 1, in which each of said electrically operative switches is a latching relay with an energizing winding and a reset winding.

4. A changeover system in accordance with claim 1, in which a pilot light is provided for each generator, together with circuit means from said manually operative switches and said supply for energizing the pilot light for an operating generator.

5. A changeover system comprising a plurality of sound generators, an amplifier connectable to all of said generators, a power supply, electrically operative switches each having a pair of windings, said switches corresponding in number to said generators each of said switches being associated with a particular generator, for connecting its associated generator to said amplifier with one energization of one of said windings by said supply and disconnecting all of said other generators from said amplifier with another energization of one winding on each of said other switches by said supply, plural contact manually operative switches corresponding in number to said generators and said electrically operative switches, and circuit connections connecting said supply, said amplifier, and said electrically operative switches, one contact on each of said manually operative switches being made first before its other contacts are made for short-circuiting said amplifier, the making of said other contacts energizing the winding of its corresponding electrically operative switch to connect its corresponding generator to said amplifier, and energizing one winding of each of all other electrically operative switches to disconnect any other generator connected to said amplifier from said amplifier.

6. A changeover system in accordance with claim 5, in which electrically operative relays corresponding in number to said electrically operative switches are provided, said electrically operative relays each having a pair of windings connected in parallel with the pair of windings on a respective electrically operative switch.

7. A changeover system in accordance with claim 5, in which said plural contact manually operative switches each have four make and break contacts, three of said contacts being normally open and one closed, actuation of a switch closing first one contact to short-circuit the input of said amplifier, then opening its normally closed contact to prevent actuation of its corresponding electrically operative switch to disconnect said corresponding generator from said amplifier, and then closing its remaining two contacts to connect said supply to its corresponding electrically operative switch to energize said switch and connect said corresponding generator to said amplifier and connect said other electrically operative switches to said supply over their normally closed contacts to disconnect any previously connected generator from said amplifier.

8. A changeover system in accordance with claim 7, in which each of said electrically operative switches is a latching relay with an energizing winding and a reset winding.

9. A changeover system comprising a plurality of current generators, an amplifier, an electrically operative switch for each current generator, a manually operative switch for each electrically operative switch, a power supply, a circuit connecting said supply and each of said manually operative switches and said electrically operative switches, the closing of any one manually operative switch connecting its respective electrically operative switch to said supply for actuating said electrically operative switch in one direction and connecting said other electrically operative switches to said supply for actuating said other electrically operative switches in another direction, and a circuit connecting each of said manually operative switches and said amplifier for short-circuiting the input to said amplifier upon actuation of any one of said switches, said electrically operative switches acting to connect each of said generators to said amplifier at mutually exclusive times.

10. A changeover system in accordance with claim 9, in which a pilot light is provided for each electrically operative switch and energized when said electrically operative switch is actuated in one direction, said electrically operative switches being latching relays.

References Cited in the file of this patent

UNITED STATES PATENTS

| Number | Name | Date |
|---|---|---|
| 2,036,306 | Soons | Apr. 7, 1936 |
| 2,106,957 | Nielsen | Feb. 1, 1938 |
| 2,181,513 | Kurtze | Nov. 28, 1939 |
| 2,277,207 | Chenoweth et al. | Mar. 24, 1942 |
| 2,305,681 | Dunning | Dec. 22, 1942 |
| 2,542,188 | Gates | Feb. 20, 1951 |